(12) United States Patent
Liu et al.

(10) Patent No.: US 9,892,666 B1
(45) Date of Patent: Feb. 13, 2018

(54) THREE-DIMENSIONAL MODEL GENERATION

(75) Inventors: Qiang Liu, Cupertino, CA (US); Samuel Henry Chang, San Jose, CA (US); Eric G. Marason, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 832 days.

(21) Appl. No.: 13/528,759

(22) Filed: Jun. 20, 2012

(51) Int. Cl.
G03B 21/28 (2006.01)
G03B 37/00 (2006.01)
G09F 19/18 (2006.01)

(52) U.S. Cl.
CPC ............ *G09F 19/18* (2013.01); *G03B 37/00* (2013.01)

(58) Field of Classification Search
CPC ................................ G09F 19/18; G03B 37/00
USPC ................................................ 348/49; 353/98
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2003/0081952 | A1* | 5/2003 | Geng ............................. 396/427 |
| 2009/0244309 | A1* | 10/2009 | Maison et al. ............. 348/222.1 |
| 2010/0053309 | A1* | 3/2010 | Kondo ............... G02B 27/2214 348/49 |
| 2011/0211175 | A1* | 9/2011 | Stehle et al. .................... 353/98 |
| 2012/0223885 | A1 | 9/2012 | Perez |

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Nguyen Truong
(74) *Attorney, Agent, or Firm* — Lee & Hayes, PLLC

(57) ABSTRACT

Within a particular environment, a projection that may include light or one or more patterns may be directed at one or more mirrors. The projection may be reflected by a first one of the mirrors onto the surroundings of the environment, which may include a floor, one or more walls, and/or objects in the environment having a surface. A second mirror may represent an entire view of the surroundings of the environment. As a result, by taking an image directed at the second mirror, a single image may be captured that represents a view of the entire environment without having to rotate the device that captures the image. The single image may then be utilized to generate a three-dimensional model of the environment.

23 Claims, 5 Drawing Sheets

THREE-DIMENSIONAL MODEL GENERATION

BACKGROUND

Camera and laser based three-dimensional (3D) scanners and cameras have been designed and used in the reconstruction of working environments in various technological areas. In order to generate a two-dimensional (2D) or 3D model of a particular working environment, currently existing 3D scanners measure the surrounding space by rotating the sensor to obtain different views of the environment. For instance, a camera may be rotated around the environment while images that represent different views of the environment are being captured. This process continues until each view of the environment has been attained. However, in order to generate a 3D model of the entire environment, the multiple images need to be overlapping so that the different views of the environment can be merged into a single image and model. That is, current techniques for generating 3D models of working environments require capturing multiple overlapping images and then performing an image registration process where the images are subsequently merged so that the end result represents a model of the entire environment. Such practices are typically time consuming and are generally only suitable for off-line applications.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
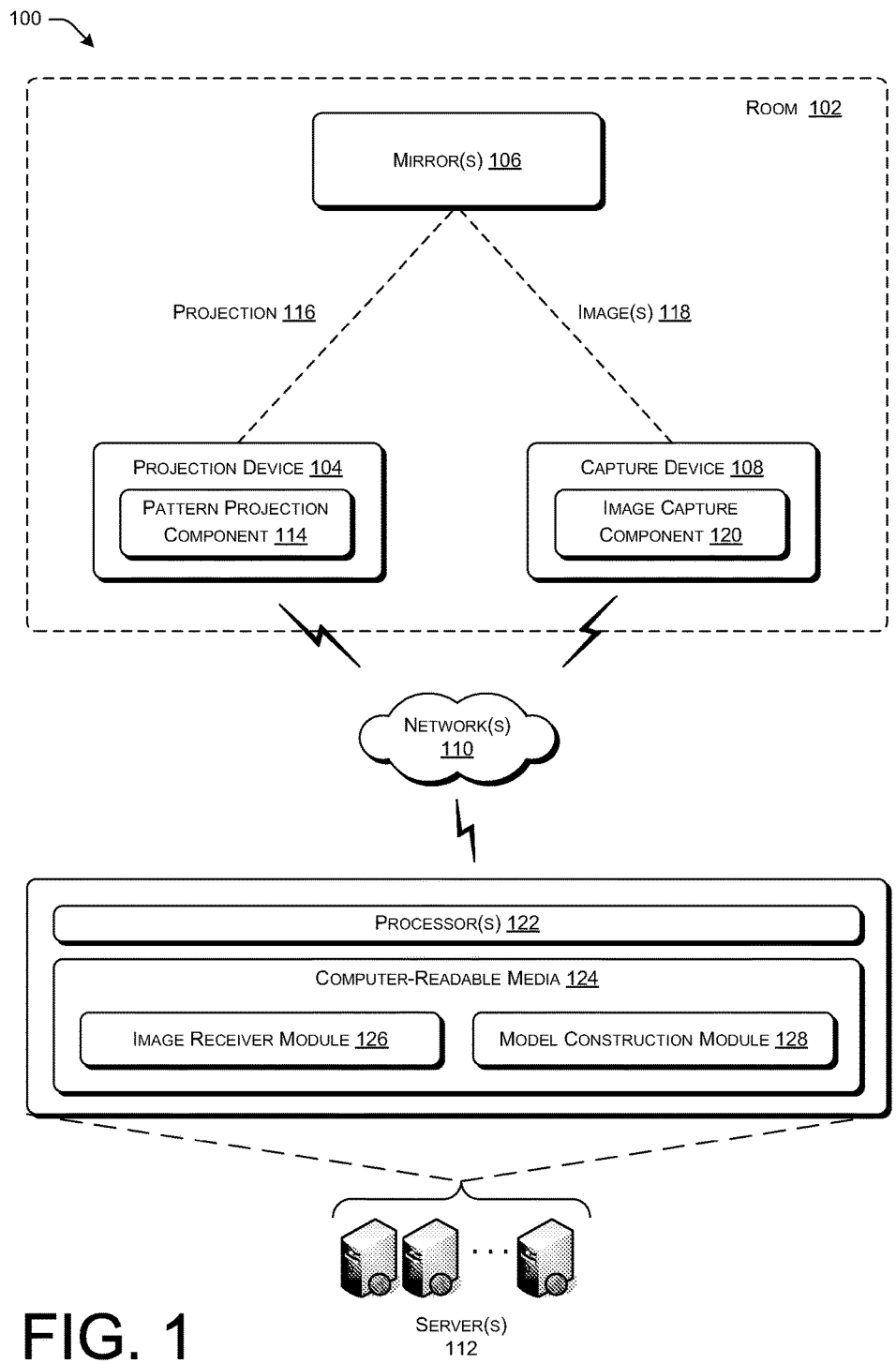
FIG. 1 is a diagram showing an example system for generating a three-dimensional model of an environment.

This disclosure describes systems and processes for generating a three-dimensional (3D) model of an environment, such as a room or some other working environment. More particularly, a 3D model of an environment may be generated that represents the orientation of objects or components in the environment and/or the spatial relationships associated with those objects or components. That is, with respect to a room, the distances between the walls, the ceiling, and objects within that room (e.g., a table) may be determined and represented by the 3D model. In addition, the orientation and spatial relationships associated with any components that are used to generate the 3D model, such as a projection device, a capture device, or one or more mirrors, may also be determined and reflected in the 3D model.

As stated above, existing techniques that are used to generate 3D models for an environment typically involve utilizing a rotating scanner or camera to capture multiple images that reflect different views of the environment. Then, provided that the multiple images are overlapping, a 3D model may be generated by merging the overlapping images. However, described herein are systems and processes for reconstructing a 3D model of an environment (e.g., a room) without any rotation or translation operations of the one or more sensing devices that are being used. More particularly, a projection device may project light or patterns onto a first mirror, such as a hyperboloidal or paraboloidal shaped mirror, which may then reflect the projected light or patterns onto the surroundings of the environment. Since, the projected patterns have been projected onto the surroundings via the first mirror, a second mirror may then reflect the surroundings with the associated patterns. Then, a stationary capture device, such as a camera, may be directed at the second mirror in order to capture a single, unified image or multiple images that represent the surroundings of the entire environment. In various embodiments, the one or more images may be processed to reconstruct the 3D model of the environment.

Therefore, with such mirrors, a 3D model of a room may be reconstructed utilizing a projection device and a capture device, which may be a single device or multiple devices. Moreover, since a hyperboloidal mirror may allow the entire surroundings of the room (e.g., floor, walls, objects in room, etc.) to be captured in a single, unified image, the 3D model may be generated without having to rotate the capture device. Once the 3D model has been generated, the orientation and spatial relationships of the items associated with the room may also be determined. As a result, the 3D model may accurately represent the actual dimensions of the room and the distances between such items. Based at least partly on this 3D model, the systems and processes described herein may determine a region on an appropriate surface in the room (e.g., wall, floor, table, etc.) that can be used to project texts, graphics, and/or images, either automatically or manually.

The discussion begins with a section, entitled "Example Environment," describing a system for generating a three-dimensional model of an environment. Next, the discussion includes a section, entitled "Pattern Projection and Image Capture," that describes a process for capturing an image that represents an entire view of an environment. The discussion then moves on to a "Three-Dimensional Model Generation" section that describes a process for generating a three-dimensional model of an environment based at least partly on an image of the environment. Then, the discussion includes an "Example Model Generation" section that describes an example technique for generating a three-dimensional model of an environment. The discussion then includes a section, entitled "Example Processes," that illustrates and describes example processes for generating a three-dimensional model of an environment. Lastly, the discussion includes a brief "Conclusion".

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

FIG. 1 illustrates an example system 100 for generating or reconstructing a 3D model of an environment, such as a room 102. In particular, the room 102 may include a projection device 104, one or more mirrors 106, and a capture device 108. The projection device 104 and the capture device 108 may be communicatively coupled to one or more network(s) 110, which may allow the exchange of data or information between the projection device 104 and/or the capture device 108 and one or more server(s) 112.

A single image that is representative of the entire environment or multiple images that are representative of the environment may be utilized to generate a 3D model of the environment. The single image may be captured by first projecting light or patterns to a first mirror, which may then reflect the light or patterns onto the surroundings of the environment. A second mirror may then reflect the surroundings of the environment having the light or patterns reflected thereon. Either simultaneously or afterwards, a device may take an image of the second mirror such that the image represents the surroundings of the environment. As a result, the single image that represents an entirety of the surroundings of the environment may be captured without having to rotate the device that is actually taking the image. As such, the device may remain stationary when capturing image.

More particularly, and as shown, the projection device 104, the mirror(s) 106, and the capture device 108 may each be situated in the same room 102 and may be placed in any orientation within the room 102 and with respect to one another. In various embodiments, a pattern projection component 114 of the projection device 104 may project or transmit light or patterns onto a first mirror 106. As illustrated in FIG. 1, the light or patterns that are projected by the projection device 104 may be referred to as a projection 116. Any type of light (e.g., laser light) or patterns (e.g., horizontal lines, vertical lines, etc.) may be included in the projection 116 and may be directed towards the first mirror 106. In some embodiments, the pattern may be a grid that is projected on to the surroundings of the room 102. Such a pattern may be generated by a diffractive optical element (DOE) associated with the projection device 104 and a laser. In addition, projecting multiple patterns in a sequence may also reveal the room 102 in additional detail. Moreover, the projection device 104 may be any type of device, such as a projector, that is capable of projecting light or patterns onto a surface, such as a wall, a floor, a ceiling, or the mirror(s) 106.

The mirror(s) 106 may be any type of mirror that may capture or reflect an entirety of its surroundings or at least a substantial portion of its surroundings. For instance, provided that the mirror(s) 106 are situated in the room 102, the mirror(s) 106 may reflect the entire room 102, which may include a floor, one or more walls, a ceiling, and any other objects (e.g., a table, chairs, etc.) that are in the room 102. That is, by viewing the mirror(s) 106, one may view the room 102 in its entirety. In some embodiments, although the mirror(s) 106 may take any form, the mirror(s) 106 may be a convex mirror 106, such as a hyperboloidal or paraboloidal mirror (e.g., having a hemispherical or dome-like shape) or a mirror having a cone-like shape. In these embodiments, the projection 116 may be directed towards the reflecting surface of the mirror(s) 106. Moreover, the shape of the mirror(s) 106 may vary so long as the shape of the mirror 106 is known prior to projecting the projection 116 and capturing the image(s) 118.

Upon the projection 116 being directed towards a first one of the mirror(s) 106, that mirror 106 may reflect the projection 116 (e.g., light, patterns, etc.) onto its surroundings. For example, the projected light or patterns may be reflected by that mirror 106 onto the floor, walls, and any other objects included in the room 102 that have a relatively flat surface, such as a table. As a result, the projection 116 that is projected by the projection device 104 and directed towards the first mirror 106 may then be projected upon the entire room 102. In various embodiments, provided that the mirror 106 is curved, the mirror 106 may refocus the pattern. In order to prevent potential blurriness of the projection 116 (e.g., the pattern), the patterns may be projected utilizing a laser or some other high f-number light source. In other embodiments, the projection 116 may include infrared light, which may serve as an invisible alternative to mapping the room 102.

Either simultaneously or after the projection 116 is projected onto the surroundings of the room 102, an image capture component 120 of the capture device 108 may capture one or more images 118 of the room 102. More particularly, the capture device 108 may take an image 118 of a second one of the mirror(s) 106, which may reflect the surroundings of the room 102, including the projection 116 that has been projected upon the surroundings of the room 102. In various embodiments, the capture device 108 may be any type of device, such as a camera or a scanner, that is able to capture an image 118 of one or more objects. Moreover, the image 118 may be a photograph, a video, or any other type of image that presents or represents an entire view of the room 102.

Accordingly, since the second mirror 106 is able to reflect the room 102 in its entirety, a single or unified image 118 of the mirror 106 taken by the capture device 108 may represent the entire view of the room 102. Moreover, the image 118 may include multiple images or a sequence of images that are taken over time. In embodiments where the mirror 106 is affixed to, or is near, the ceiling of the room 102, the image(s) 118 may display the floor, walls, and any objects included in the room 102. In various embodiments, although shown as two different components, the projection device 104 and the capture device 108 may also be a single device that both transmits the projection 116 and captures the image(s) 118. An optical axis associated with the capture device 108 may also be non-coaxial with the projection device 104. Furthermore, in the event that the captured image(s) 118 are distorted in some manner, an optical narrow bandpass filter that is situated in front of the capture device 108 and a laser may be utilized, which may enable the server 112 to map the room 102 even if the room 102 is brightly lit.

Although a single mirror 106 is shown in FIG. 1, the system 100 may include multiple mirrors 106, such as a first mirror 106 associated with the projection device 104 and a second mirror 106 associated with the capture device 108. In these embodiments, the projection 116 may be directed to the first mirror 106, which may reflect the projection 116 onto the surroundings of the room 102. Further, the capture device 108 may take the single image 118 by directing the capture device 108 towards the second mirror 106, which may reflect and represent the entire view of the room 102, including the projection 116 that has been projected upon the surroundings of the room 102. As stated above, the projection device 104, the mirror(s) 106, and the capture device 108 may be placed in any orientation within the room 102 and may be spaced apart at predetermined distances. For example, the mirror(s) 106 may be placed on the ceiling of the room 102 so that the floor, walls, and objects affixed to the walls or placed upon the floor may be captured by the one or more images 118.

Therefore, the system 100 is able to project light or patterns onto the surroundings of an environment (e.g., room 102) utilizing one or more mirrors 106 and then capture a single image 118 (or multiple images 118) of the environment that represents an entire view of the environment. This image 118 may be captured without having to rotate or otherwise manipulate the projection device 104, the mirror(s) 106, or the capture device 108. As a result, the same mirror 106 can be utilized to project a pattern onto the surroundings of the room 102, reflect the entire room 102, and collect a single image 118 that represents or portrays the entire room 102. In other embodiments, multiple mirrors 106 may be utilized—a first mirror 106 to reflect the projection 116 onto the surroundings of the room 102 and a second mirror 106 to enable the capture device 108 to capture one or more images 118 of the room 102.

As mentioned previously, the projection device 104 and the capture device 108 may be communicatively coupled to one or more network(s) 110. For instance, the projection device 104 and the capture device 108 may be controlled via the network(s) 110, such as by being controlled by an individual or the server(s) 112. That is, an individual may control when the projection device 104 is to transmit the projection 116 and when the capture device 108 is to take or capture the image 118. Moreover, the image(s) 118 that are collected by the capture device 108 may then be transmitted to the server(s) 112 via the network(s) 110. In some embodiments, the network(s) 110 may be any type of network known in the art, such as the Internet. Moreover, projection device 104, the capture device 108, and the server(s) 112 may communicatively couple to the network(s) 110 in any manner, such as by a wired or wireless connection. The network(s) 110 may also facilitate communication between the projection device 104, the capture device 108, and/or the server(s) 112, as stated above.

As shown, the server(s) 112 may include one or more processor(s) 122 and computer-readable media 124, which may include an image receiver module 126 and a model construction module 128. More particularly, the server(s) 112 may cause the projection device 104 to transmit the projection 116 and may cause the capture device 108 to take and capture the image(s) 118. Once the image(s) 118 are received by the image receiver module 126, the image(s) 118 may be analyzed in various manners. Moreover, the model construction module 128 may utilize the image(s) 118 in order to generate or reconstruct a 3D model of the room 102, which will be described in additional detail in FIGS. 2-5.

In various embodiments, the processor(s) 122 of the server(s) 112 may execute one or more modules and/or processes to cause the server(s) 112 to perform a variety of functions, as set forth above and explained in further detail in the following disclosure. In some embodiments, the processor(s) 122 may include a central processing unit (CPU), a graphics processing unit (GPU), both CPU and GPU, or other processing units or components known in the art. Additionally, each of the processor(s) 122 may possess its own local memory, which also may store program modules, program data, and/or one or more operating systems.

In at least one configuration, the computer-readable media 124 of the server(s) 112 may include any components that may be used to receive the image(s) 118 and reconstruct a 3D model of the room 102 utilizing the image(s) 118. Depending on the exact configuration and type of the server(s) 112, the computer-readable media 124 may also include volatile memory (such as RAM), non-volatile memory (such as ROM, flash memory, miniature hard drive, memory card, or the like), or some combination thereof. Furthermore, the server(s) 112 may also include additional components not listed above that may perform any function associated with the server(s) 112. In various embodiments, the server(s) 112 may include a single server or multiple servers and may be any type of server, such as a network-accessible server.

As a result, the system 100 may capture a single image 118 (or multiple images 118) of the room 102 that represents an entire view of the room 102. Provided that a single image 118 is captured, the single image 118 may be obtained utilizing one or more mirrors 106 and without having to rotate the capture device 108. The server 112 may then utilize the single image 118 in order to generate a 3D model of the room 102. Therefore, the system 110 avoids needing to take multiple overlapping images 118 of the room 102 and then merge the overlapping images 108 to create the 3D model, which is both time consuming and overly complicated.

Pattern Projection and Image Capture

Figure 2:
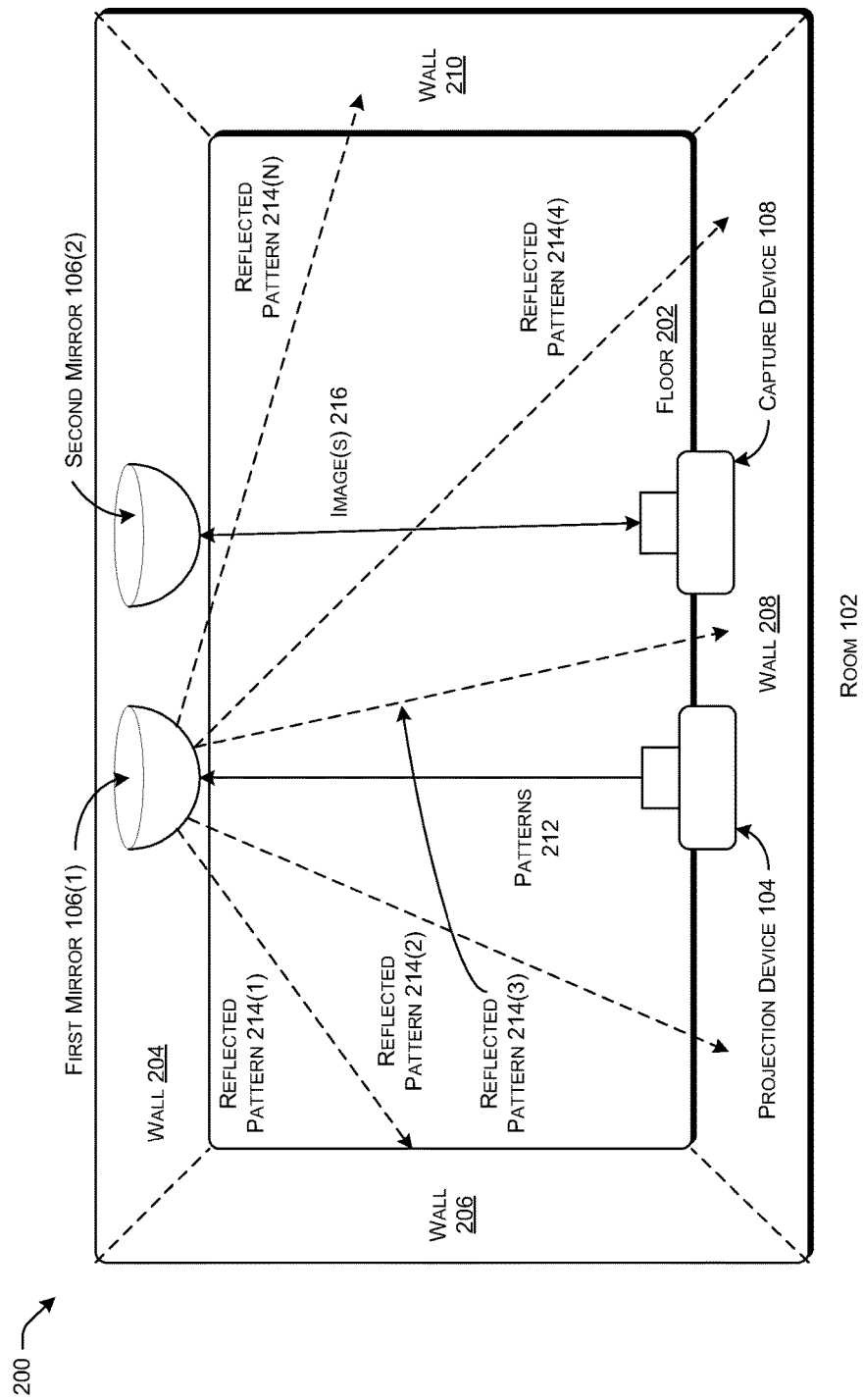
FIG. 2 is a diagram showing an example system for capturing a single or unified image of an environment utilizing a projection device, one or more mirrors, and a capture device.

FIG. 2 illustrates a diagram representing a system 200 that captures a single image of an environment that can be utilized to generate a 3D model of that environment. In various embodiments, the environment is represented as a room 102 that includes a floor 202, and four walls 204-210, although any number of walls 204-210 may be present. Also included in FIG. 2 are the projection device 104, a first mirror 106(1), a second mirror 106(2), and the capture device 108, which can be placed in any location within the room 102 and/or in any orientation. In some embodiments, the first mirror 106(1) and/or the second mirror 106(2) may be placed on one of the walls 204-210 or on or near the ceiling of the room 102. Moreover, and as shown, the projection device 104 and/or the capture device 108 may be inside the room 102. Alternatively, the projection device 104 and the capture device 108 may be outside of the room 102, but are still able to transmit the projection 116 and capture the image(s) 118, respectively.

In some embodiments, the projection device 104 may project one or more patterns 212 that are directed at the first mirror 106(1), which may be any type of mirror (e.g., a hyperboloidal mirror) that is able to reflect or project an entire view of the room 102. The patterns 212 may then be reflected by the first mirror 106(1) onto the surroundings of the room 102. That is, the first mirror 106(1) may reflect the patterns 212 onto any surface associated with the floor 202, the walls 204-210, and objects that are within the room 102, such as objects that are affixed to or are adjacent to the walls 204-210 or objects that are situated on the floor 202. Here, the reflected patterns 214(1)-214(N) are directed towards the floor 202 and the walls 204-210 of the room 102. The reflected patterns 214(1)-214(N) are intended to represent the patterns 212 that are reflected by the first mirror 106(1) throughout the room 102 and are not limited to the reflected patterns 214(1), 214(2), 214(3), 214(4), and 214(N) shown in FIG. 2.

Once the reflected patterns 214(1)-214(N) are directed to the surroundings of the room 102, the capture device 108 may capture an image 216 of the room 102. That is, the capture device 108 may collect a single image 216 (or multiple images 216) of the room 102 by taking an image 216 of the second mirror 106(2), which may reflect the surroundings of the room 102 and the corresponding reflected patterns 214(1)-214(N). As a result, since the second mirror 106(2) is able to display an entire view of the room 102, including the reflected patterns 214(1)-214(N), a single image 216 taken of the second mirror 106(2) may represent a complete view of the room 102, which may include the floor 202, the walls 204-210, and any objects included in the room 102. As described herein, the image(s) 216 may then be used to reconstruct or generate a 3D model of the room 102. The 3D model may then be utilized to identify surfaces in the room 102 (e.g., floor 202, walls 204-210, objects in the room 102, etc.) for projecting texts, one or more graphics, one or more images, etc.

In certain embodiments, the light that is directed towards the first mirror 106(1) may include laser light that is collimated, meaning that the rays associated with the laser light are parallel or are approximately parallel, and therefore will spread more slowly as the laser light propagates. As a result, the laser light will disperse minimally with distance and thus will have a minimum amount of divergence. In such embodiments, the laser light may be projected to the first mirror 106(1), which may cause the laser light to be reflected onto the floor 202, the walls 204-210, and any other surfaces corresponding to objects in the room 102. The image 216 of the room 102 may then be captured by the capture device 108. In example embodiments, using laser light, a single mirror 106 may also be used where the laser light may be projected, reflected, and an image 216 can be captured at approximately the same time. In other embodiments, the laser light can be pulsated, meaning that the laser light can be transmitted at a first time and then an image 216 can be captured or collected at a second time subsequent in time to the first time.

In some embodiments, the projection device 104 projecting the patterns 212 and the capture device 108 capturing the image 216 may be synchronous or approximately synchronous. That is, while the projection device 104 is transmitting the patterns 212 and while the first mirror 106(1) is reflecting the patterns 212 as the reflected patterns 214(1)-214(N), the capture device 108 may take the image 216 of the second mirror 106(2). As a result, the single image 216 of the room 102 may be collected at the same time, or at about the same time, as the patterns 212 are being projected towards the first mirror 106(1). Therefore, the first mirror 106(1) may be associated with the projection device 104 and the second mirror 106(2) may be associated with the capture device 108. The projection device 104 may then project the patterns 212 onto the first mirror 106(1) and the capture device 108 may then take the image 216 of the second mirror 106(2) at approximately the same time.

As stated elsewhere herein, the orientation of the projection device 104, the first mirror 106(1), the second mirror 106(2), and the capture device 108 within the room 102 may vary. In various embodiments, the first mirror 106(1) and/or the second mirror 106(2) may be located on or close to the ceiling of the room 102, where the reflecting surface(s) of each mirror 106 may face the floor 202 of the room 102. Since the floor 202 and the walls 204-210 of the room 102 are likely to be perpendicular with respect to one other, the portion of the mirrors 106 that reflect the patterns 212 may be facing one or more points that are near the intersection between the floor 202 and the walls 204-210. Since the mirrors 106 can be facing both the floor 202 and the walls 204-210 at about a 45° angle, the mirrors 106 may be able to reflect both the floor 202 and the walls 204-210 of the room 102. As a result, provided that the captured device 108 is situated at a position below the reflecting surface of the second mirror 106(2), when the capture device 108 takes a picture of the second mirror 106(2), the resulting image 216 then represents an entire view of the room 102, which includes both the floor 202 and the walls 204-210 of the room 102.

Three-Dimensional Model Generation

Figure 3:
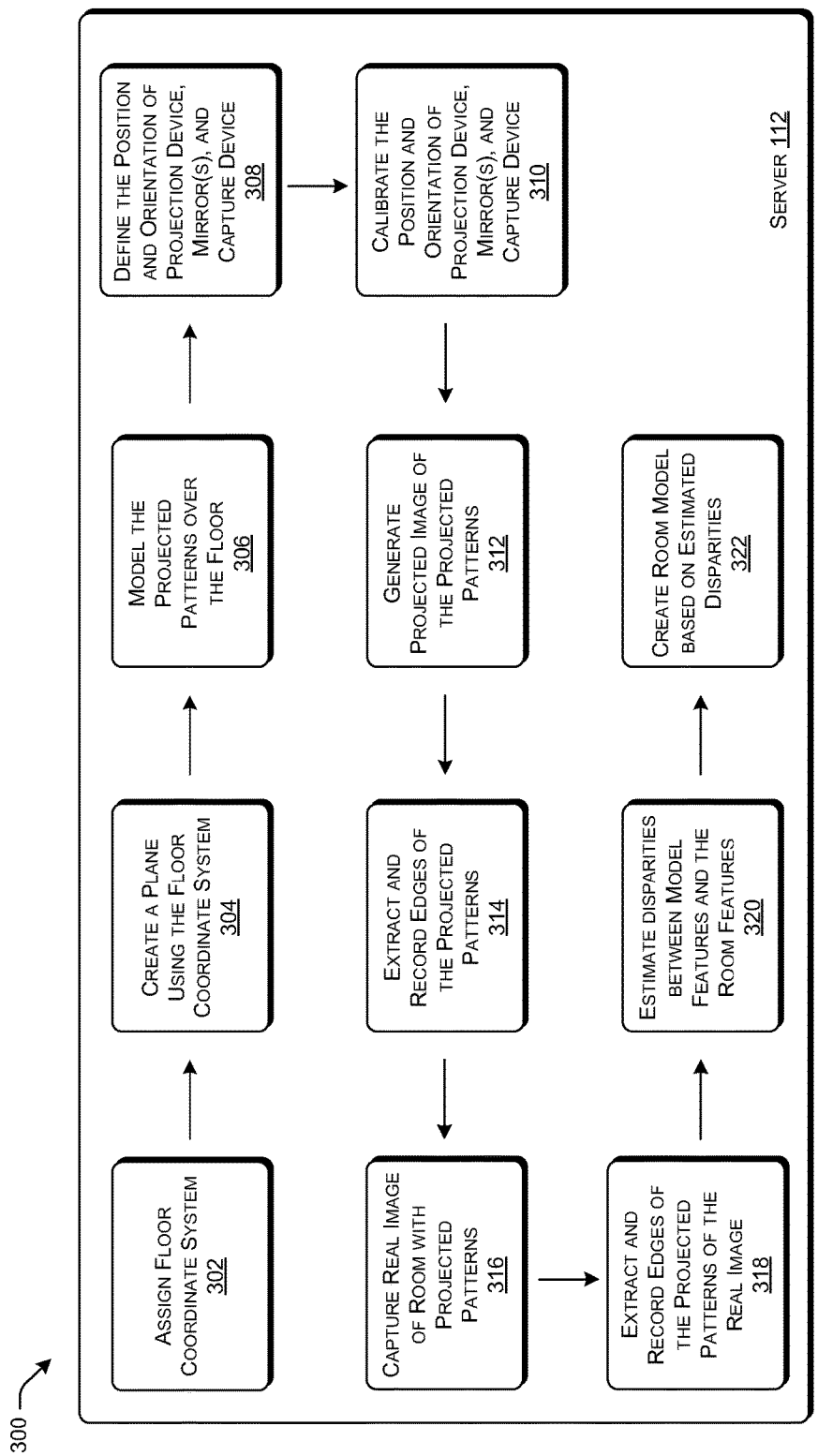
FIG. 3 is a diagram showing an example system determining the spatial relationships and orientation of various components in order to generate a three-dimensional model of an environment.

FIG. 3 illustrates a diagram representing a system 300 that generates a 3D model of an environment based at least partly on a single image that represents the environment. More particularly, the system 300 represents operations performed by the server 112 after the projection device 104 has projected patterns 212 onto the first mirror 106(1), the first mirror 106(1) has reflected those patterns (e.g., reflected patterns 214(1)-214(N)) onto the surroundings of the environment, and the capture device 108 has captured a single image 216 of the second mirror 106(2) that represents an entire view of the environment. Such operations may include determining the orientation and depth of the objects included in the environment (e.g., floor 202, walls 204-210, objects in the room 102, etc.).

At block 302, the server 112 may assign a floor coordinate system to the room 102. More particularly, in order to generate the 3D model of the room 102, the server 112 may establish a floor coordinate system that is utilized to create a plane with respect to the floor 202 of the room 102, as shown in block 304. Using the plane, the server 112 may be able to calculate the geometry of the floor 202, meaning that the server 112 may be able to determine the dimensions of the floor 202 for the 3D model. Upon determining the floor dimensions of the room 102, the server 112 may then determine the distances between each of the walls 204-210 of the room 102. In various embodiments, in order to generate the dimensions of the room 102, a fiduciary scale associated with the image may be utilized. In other embodiments, the server 112 may determine the dimensions of the room 102 relative to the various objects included in the room 102.

At block 306, the server 112 may model the projected patterns 212 over the floor 202 of the room 102. That is, the features or edges from the projected patterns 212 that have been projected onto the floor 202 of the room 102 may be modeled. At block 308, the position and orientation of the projection device 104, the mirror(s) 106, and/or the capture device 108 may be defined. The position and orientation may be defined in any manner and may be utilized to determine how the patterns 212 will be reflected by the first mirror(1) 106 onto the surroundings of the room 102 and how the capture device 108 will capture the single image 216 of the room 102 utilizing the second mirror 106(2). In certain embodiments, the mirror(s) 106 may be positioned towards the ceiling of the room 102 and the projection device 104 may be positioned somewhere below the reflecting surface of the mirror 106 such that the patterns 212 may be directed at, and reflected by, the first mirror 106(1).

The capture device 108 may also be positioned at a location below the reflecting surface of the second mirror 106(2) so that the image 216 may be collected by directing the capture device 108 at the second mirror 106(2). Furthermore, provided that the mirror(s) 106 are convex mirrors 106 (e.g., hyperboloidal, paraboloidal, cone shaped, etc.), the reflecting portions of the mirror(s) 106 may be facing both the floor 202 and the walls 204-210 of the room 102. For instance, the mirror 106(s) may be oriented such that the reflecting surface of the mirror 106(s) are at about a 45° angle with respect to both the floor 202 and the walls 204-210. In addition, the parameters of the mirror(s) 106 may also be defined, which may include the size and shape of the mirror(s) 106.

At block 310, the position and orientation of the projection device 104, the mirror(s) 106, and/or the capture device 108 may be calibrated. In various embodiments, the projection device 104, the mirror(s) 106, and/or the capture device 108 may be calibrated utilizing the floor coordinate system set forth above with respect to block 302. In addition, the parameters associated with the mirror(s) 106 (e.g., shape, size, etc.) may also be calibrated with respect to the floor coordinate system.

Block 312 illustrates that a projected image of the projected patterns 212 may be generated by the server 112, and the edges of the projected patterns 212 may be extracted and recorded in block 314. In response to the projected patterns 212 being extracted and recorded, a real image of the room 102 that includes the projected patterns 212 may be captured, as shown in block 316. Then, in block 318, the edges of the projected patterns 212 associated with the real image may be extracted.

In block 320, the server 112 may estimate the disparities between the model features and the room features, such as by utilizing a disparity map. In various embodiments, the disparity of the two sets of edge features may be defined as the difference in position along a direction based on a transformation matrix between a coordinate associated with the location of the projection device 104 and a coordinate associated with the location of the capture device 108. That is, the server 112 may utilize the projected patterns 212 to estimate disparities between the features included in the room 102 (e.g., projection device 104, mirror(s) 106, capture device 108, floor 202, walls 204-210, etc.) and those same features that are included in the generated 3D model of the room 102.

Prior to calculating the disparities described above, the server 112 may use calibration data to determine the 3D relationships between the objects associated with the room 102, such as the projection device 104, the mirror(s) 106, the capture device 108, the floor 202, and the walls 204-210. That is, the server 112 may determine the geometric relationship, such as the distance and angle, between the projection device 104, the mirror(s) 106, and the capture device 108. In addition, the server 112 may also be aware of various parameters associated with the projection device 104 (pixel size, etc.), the mirror(s) 106 (e.g., shape, size, etc.), and the capture device 108 (e.g., focal length, image format, etc.). Such parameters may be calculated prior to, or after, the projection device 104 projects the patterns 212 and the capture device 108 captures the image 216. Accordingly, the server 112 may determine the orientation and position of the components associated with the room 102 and the distance between such components.

Furthermore, in block 322, the server 112 may create the 3D room model based on the estimated disparities. More particularly, the server 112 may create a 3D model of the room 102 by determining the dimensions of the floor 202 and the location and orientation of the projection device 104, the mirror 106, and the capture device 108. The server 112 may also determine the distance between such components such that the 3D model is an accurate representation of the room 102. In various embodiments, the 3D room model may be created based at least partly on the disparity map set forth above. For instance, initially a point set may be used to represent the disparity map. Then, this point set may be transformed into a surface representation, such as triangles, and a related index may then be converted into a distance metric (e.g., meters). In additional embodiments, if any disparities are identified, the server 112 may adjust the 3D model of the room 102 in order to resolve those disparities.

Example Model Generation

Figure 4:
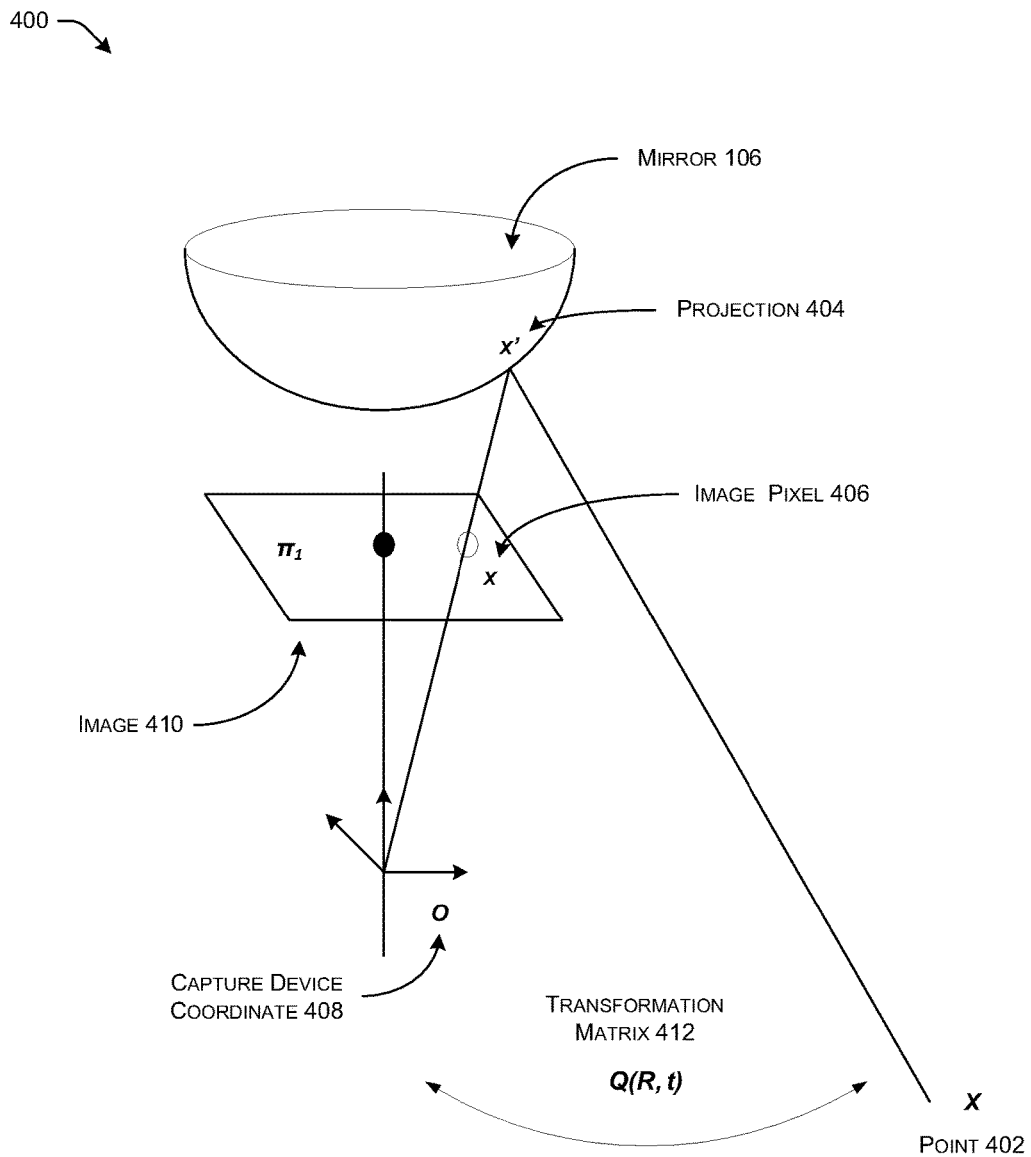
FIG. 4 is a diagram showing an example system for generating a three-dimensional model of an environment.

FIG. 4 illustrates a diagram representing a system 400 that illustrates an example process for generating a 3D model of an environment. As shown, the system 400 includes a mirror 106 (e.g., the second mirror 106(2)), a point X 402, a projection x' 404, an image pixel x 406, a capture device coordinate O 408, an image $\pi_1$ 410, and a transformation matrix Q(R,t) 412. More particularly, the point X 402 may represent any 3D point or location in the room 102, such as the floor 202, or a portion thereof, one of the walls 204-210, or a portion thereof, or any object that is within the room 102. Moreover, projection x' 404 is a projection of point X 402 to the mirror 106 and image pixel x 406 corresponds to an image pixel representing the projection from projection x' 404 to the image $\pi_1$ 410 that is taken by the capture device 108.

In various embodiments, the capture device coordinate O 408 represents a position or location of the capture device 108 that is associated with the room 102. As shown, the capture device coordinate O 408 may represent the capture device 108 capturing the image $\pi_1$ 410, including the image pixel x 406, by directing the capture device 108 at the mirror 106. Furthermore, with respect to the image $\pi_1$ 410, the location of the image pixel x 406 that is reflected by the mirror 106 may correspond to the location of the point X 402 in the room 102.

Moreover, the point X 402, may first be projected to projection x' 404 of the mirror 106 and then transformed to the image pixel x 406 with respect to the capture device coordinate O 408. More particularly, the transformation matrix Q(R,t) 412 may transform point X 402 in the room 102 to its corresponding image pixel x 406 in the image $\pi_1$ 410. In various embodiments, the transformation matrix Q(R,t) 412 may represent a relationship between a first coordinate system, such as a coordinate system associated with the capture device 108, and a different coordinate system. Moreover, the transformation matrix Q(R,t) 412 may include at least two parts—a rotation matrix R and a translation vector t. The rotation matrix R may correspond to a 3×3 rotation matrix that rotates a direction from a first coordinate to a second, different coordinate. Each 3×1 column vector of the transformation matrix Q(R,t) 412 may represent a new axis of the coordinate with respect to previous coordinate system prior to the rotation. Further, the translation vector t may correspond to a 3×1 translation vector that translates a position from the previous coordinate system to a new coordinate system. In other words, the rotation matrix R and the translation vector t may transform a point (e.g., point X 402) in the room 102 first to the mirror 106 and then, to the corresponding image pixel (e.g., image pixel x 406) in the image $\pi_1$ 410.

In example embodiments, with respect to the transformation matrix Q(R,t) 412 transforming point X 402 to projection x' 404, it is contemplated that x'=QX. Moreover, provided that K corresponds to an intrinsic matrix associated with the capture device 108, and with respect to the transformation from projection x' 404 to image pixel x 406, then Q'(R',t'). As a result, image pixel x 406 may be defined as x=[KQ|O] X=[KQ|O] [X_1]', where "X_" may correspond to the homogeneous representation of point X 402. In various embodiments, K, Q, and P may be calibrated based at least partly on the capture device 108 characteristics and how the system 400 is set up.

With respect to the calibration referenced above, the system 400 may help ensure that the transformation matrix Q(R,t) 412 is properly transforming point X 402 to projection x' 404 to image pixel x 406 of the image $\pi_1$ 410. For instance, the orientation of the mirror 106 may reflect the various projection points corresponding to one another. Further, provided that the intended orientation of the mirror 106 is a 45° angle facing the capture device 108, the true orientation of the mirror 106 may be 45° or slightly different. Performing the calibration may enable the system 400 to identify any difference between the intended orientation of the mirror 106 and the true orientation of the mirror 106.

As stated above, rotation matrix R and translation vector t may represent the transformation from one point in coordinate system to another point. For instance, rotation matrix R and translation vector t may represent the transformation from point X 402 to the image pixel x 406. However, such a transformation may be based on an ideal projection, meaning that a point in the room 102 is projected directly from a first position to a second position without incurring a turn point. For the purposes of this discussion, a turn point may refer to some object or occurrence that may cause the transformation to occur in an unexpected or unpredicted manner. In these embodiments, one turn point may correspond to the point X 402 being projected from the room 102 to the mirror 106, and not being projected directly from the room 102 to the image $\pi_1$ 410. Here, the mirror 106 would represent the turn point since the mirror 106 may serve as an intermediary between the point X 402 and the image pixel x 406 of the image $\pi_1$ 410. Because the point X 402 may not be projected directly to the image $\pi_1$ 410, the mirror 106 may have some effect on the projection.

An additional turn point may correspond to the projection x' 404 projected to the mirror 106 not being directly projected into the image $\pi_1$ 410. Instead, the projection x' 404 may pass through a lens and then be projected in the image $\pi_1$ 410. The calibration performed by the server 112 may attempt to identify any turn points and then, once identified, determine the behavior of each turn point. That is, the server 112 may determine how the turn point affects the transformation of a point in the room 102 (e.g., point X 402) to its corresponding point (e.g., image pixel x 406) in the image $\pi_1$ 410.

For the turn point corresponding to the mirror 106, the server 112 may determine the orientation of the mirror 106, meaning the direction in which the reflecting surface of the mirror 106 is facing. With respect to the lens of the capture device 108, the server 112 may determine the orientation of the lens facing the image $\pi_1$ 410, the curve of the lens surface, and which direction the capture device 108 is facing. With respect to the capture device 108 lens, a set of parameters referred to as intrinsic parameters may be utilized and a set of extrinsic parameters may be used for the capture device 108 orientation and location. The same extrinsic parameters, or similar extrinsic parameters, may be utilized for the turn point relating to mirror 106 position and orientation. Therefore, the server 112 may attempt to determine both the intrinsic parameters and the extrinsic parameters for the capture device 108, and the extrinsic parameters associated with the mirror 106.

With respect to determining the extrinsic and intrinsic parameters associated with the mirror 106 and the capture device 108, the server 112 may be aware of the properties of those parameters, but the actual values associated with those parameters may be unknown. To determine the values of the parameters, the server 112 may design a particular pattern 212, treat that pattern 212 as input, and then project the pattern 212. The server 112 may then collect the corresponding output resulting from the projected pattern 212 and measure such output(s). Based at least partly on the known inputs and outputs, the server 112 may be able to identify the proper values for the intrinsic and extrinsic parameters.

One manner that may be used to identify the parameter values may be referred to as a least square parameter estimation. Using this technique, for each set of inputs and its corresponding outputs, together with the unknown parameters, one equation or a set of equations may be generated. For example, assume that p is the input vector, that q is the output vector, and that u is the parameters vector. If $U=(u_1, u_2, \ldots, u_n)$, then for m inputs and outputs, q=Up. Moreover, the value of a particular parameter (U) may be determined by utilizing the following equation, U'p=U'Uq. Accordingly, the sever 112 may be able to identify the specific values of the parameters that are associated with the extrinsic and intrinsic parameters relating to the capture device 108 and the intrinsic parameters associated with the mirror 106.

Example Processes

Figure 5:
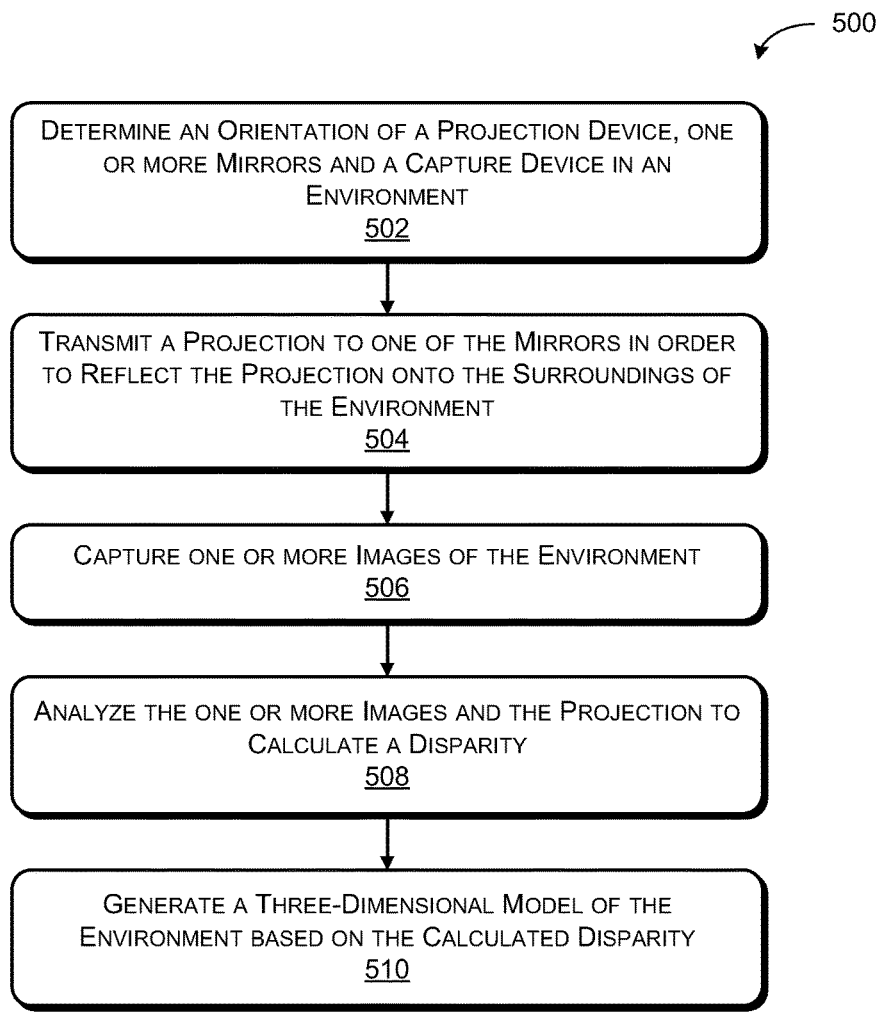
FIG. 5 is a flow diagram showing an example process of generating a three-dimensional model of an environment.

FIG. 5 describes various example processes of generating a 3D model of an environment based at least partly on an image of that environment. The example processes are described in the context of the environment of FIGS. 1-4 but are not limited to those environments. These processes are each illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

FIG. 5 is a flow diagram illustrating an example process 500 of generating a 3D image of an environment. Moreover, the following actions described with respect to FIG. 5 may be performed by at least one of the projection device 104, the mirror(s) 106, the capture device 108, the server 112, or a combination thereof, as shown in FIGS. 1-4.

Block 502 illustrates determining an orientation of a projection device, one or more mirrors and a capture device in an environment. More particularly, the environment may be representative of a room (e.g., room 102) that includes a floor (e.g., floor 202), one or more walls (e.g., walls 204-210), and/or any types of objects included in the room. In addition, the environment may include a projection device (e.g., projection device 104), such as a projector, one or more mirrors (e.g., the first mirror 106(1), the second mirror 106(2), etc.), such as a hyperboloidal mirror, and a capture device (e.g., capture device 108), such as a camera or scanner. In some embodiments, the projection device, the one or more mirrors, and the capture device may be located at predetermined locations, such as the one or more mirrors being placed on or near the ceiling of the environment and the projection device and the capture device being placed at a location that is below the reflective surface of the mirror(s).

In certain embodiments, the location and orientation of the projection device, the one or more mirrors, and the capture device may be maintained and/or recorded. In addition, the spatial relationship with respect to the above components (e.g., the distances between one another) may also be determined. As a result, the server 112 may be aware of the orientation of the projection device, the one or more mirrors, and the capture device with respect to one another.

Block 504 illustrates transmitting a projection to one of the mirrors in order to reflect the projection onto the surroundings of the environment. In various embodiments, the projection device may transmit a projection that is directed towards a first mirror. The projection may include light, such as laser light, or one or more patterns, such as a set of vertical or horizontal lines.

In response to receiving the projection from the projection device, the first mirror may reflect the patterns onto the surroundings of the environment. Provided that the environment is a room, the patterns may be reflected by the reflecting surface of the first mirror onto the floor, the walls, and any surface associated with an object (e.g., a table) that is in the room. As stated herein, the first mirror may take any form or shape that is able to reflect the projection onto the surroundings of the environment. In some embodiments, the mirror is a convex hyperboloidal mirror that is in the shape of a dome or hemisphere whose outer surface is utilized to reflect the projection.

Block 506 illustrates capturing one or more images of the environment. In particular, after the projection has been reflected onto the surroundings of the environment, the capture device may capture a single image that represents an entire view of the environment, or at least a substantial portion of the environment. The capture device may also capture multiple images or a sequence of images over time. Furthermore, since a second one of the mirrors is able to reflect a view of the entire environment, the one or more images of the entire environment may be obtained as a result of the capture device taking an image of the second mirror. Therefore, the one or more images may display the surroundings of the environment, including the projection that has been reflected thereon. The one or more images may be captured without having to rotate the capture device and without having to take multiple overlapping images of the room and then having to merge those overlapping images into a single image.

Block 508 illustrates analyzing the one or more images and the projection to calculate a disparity. Upon obtaining the single image, the server 112 may analyze the one or more images and the projection in order to calculate or determine any disparities, as set forth above with respect to FIGS. 1-5.

Block 510 illustrates generating a three-dimensional model of the environment based on the calculated disparity. More particularly, the server may reconstruct a 3D model of the environment based at least partly on the one or more images that portray the environment. Once generated, the server may determine a region or an appropriate surface in the room (e.g., floor, wall, other flat surface, etc.) for projecting text, graphics, images, etc.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a projection device configured to transmit one or more light patterns;
one or more convex mirrors configured to reflect the one or more light patterns onto one or more objects in a room;
a stationary image capture device configured to capture an image representative of the room, wherein:
a first one of the one or more convex mirrors is associated with the projection device and reflects light corresponding to the one or more light patterns onto the one or more objects included in the room;
a second one of the one or more convex mirrors is associated with the stationary image capture device and is directed at the stationary image capture device; and
an optical axis of the stationary image capture device is substantially parallel to and non-coaxial with an optical axis of the projection device; and
a computing device configured to generate, based at least in part on the image, a three-dimensional model of the room and the one or more objects.

2. The system as recited in claim 1, wherein at least one of the one or more convex mirrors is a hyperboloidal or paraboloidal mirror.

3. The system as recited in claim 1, wherein the computing device is configured to utilize the three-dimensional model to cause the projection device to project content onto a surface within the room based at least in part on determining that the surface is flat.

4. The system as recited in claim 1, wherein the one or more light patterns include a grid, a set of horizontal lines, or a set of vertical lines.

5. The system as recited in claim 1, wherein the computing device is further configured to:
estimate at least one disparity between the one or more objects from a disparity map and corresponding objects from the three-dimensional model of the room; and
adjust the three-dimensional model based on the at least one estimated disparity.

6. The system as recited in claim 1, wherein the computing device is further configured to:
record a position and an orientation of one or more of the projection device, the one or more convex mirrors, or the stationary image capture device; and
generate the three-dimensional model of the room based at least partly on the recorded position and the recorded orientation.

7. A method comprising:
under control of one or more processors of a computing device, projecting light from a projector onto a first curved mirror, the first curved mirror being associated with the projector and reflecting the light onto one or more objects in an environment;

capturing, by a stationary capture device directed at a second curved mirror, an image that represents the environment, the second curved mirror being associated with the stationary capture device, and wherein an optical axis of the stationary capture device is substantially parallel to and offset from an optical axis of the projector; and generating, based at least in part on the image, a three-dimensional model of the environment.

8. The method as recited in claim 7, wherein the image is captured without rotating the stationary capture device and without rotating the second curved mirror.

9. The method as recited in claim 7, further comprising:
determining an orientation of the second curved mirror and the stationary capture device;
determining spatial relationships between the second curved mirror, the stationary capture device, and the one or more objects included in the environment; and
generating, based at least in part on the orientation and the spatial relationships, the three-dimensional model of the environment.

10. The method as recited in claim 7, wherein:
the environment is a room that includes a floor, one or more walls, and one or more objects that have at least one flat surface;
the second curved mirror is located in a first position in the room; and
the stationary capture device is located in a second position in the room that is below a reflective surface of the second curved mirror.

11. The method as recited in claim 7, wherein the environment that is represented by the image includes one or more light patterns that are projected by the projector and that are reflected by the first curved mirror onto the environment.

12. The method as recited in claim 7, wherein an optical axis of the first curved mirror is non-coaxial with an optical axis of the second curved mirror.

13. One or more non-transitory computer-readable media having computer-executable instructions that, when executed by one or more processors, cause the one or more processors to perform operations comprising:
causing, by a projection device having an optical axis, light to be projected onto a first curved mirror, the first curved mirror being associated with the projection device and reflecting the light onto one or more objects in an environment;
receiving, at a capture device having an optical axis, one or more images that represent an environment, the capture device being directed at a second curved mirror associated with the capture device, and wherein the optical axis of the capture device is non-coaxial with the optical axis of the projection device;
generating a three-dimensional model of the environment based at least partly on the one or more images, the one or more images being formed at least partly by:
identifying a point that represents a three-dimensional object in the environment, the point being reflected by the second curved mirror; and
transforming the point to a corresponding pixel in the one or more images such that the corresponding pixel represents an actual location of the point in the environment; and
adjusting the three-dimensional model based at least in part on a difference in position between a first coordinate associated with a location of the projection device and a second coordinate associated with a location of the capture device.

14. The one or more computer-readable media as recited in claim 13, wherein the point is transformed to the corresponding pixel in the one or more images using a transformation matrix.

15. The one or more computer-readable media as recited in claim 14, wherein the transformation matrix includes a rotation matrix that rotates a direction from the point to the corresponding pixel and a translation vector that translates a position of the point to the corresponding pixel.

16. The one or more computer-readable media as recited in claim 13, wherein the operations further comprise identifying a surface in the three-dimensional model on which to project at least one of text, one or more graphics, or one or more images.

17. The one or more computer-readable media as recited in claim 13, wherein the second curved mirror reflects the entire environment.

18. A system comprising:
a projection device that is configured to transmit light corresponding to a projection onto a first curved mirror, wherein the first curved mirror is associated with the projection device and reflects the light corresponding to the projection onto one or more objects included in an environment; and
a stationary capture device directed at a second curved mirror and configured to capture an image of the environment, the second curved mirror being associated with the stationary capture device, wherein the stationary capture device and the projection device are oriented in the same direction.

19. The system as recited in claim 18, further comprising a computing device that is configured to generate a three-dimensional model of the environment based at least partly on the image.

20. The system as recited in claim 18, wherein one or more pixels associated with the image correspond to the one or more objects included in the environment.

21. The system as recited in claim 18, further comprising a computing device that is configured to:
determine an orientation and a location of the projection device, the first curved mirror, the stationary capture device, and the one or more objects included in the environment; and
generate a three-dimensional model of the environment based at least partly on the orientation and the location.

22. The system as recited in claim 21, wherein the three-dimensional model of the environment represents spatial relationships between the projection device, the first curved mirror, the stationary capture device, and the one or more objects included in the environment.

23. The system as recited in claim 18, wherein the stationary capture device is configured to capture the image without being rotated and without being moved.

* * * * *